(12) United States Patent
Redmond

(10) Patent No.: US 6,370,139 B2
(45) Date of Patent: *Apr. 9, 2002

(54) SYSTEM AND METHOD FOR PROVIDING INFORMATION DISPERSAL IN A NETWORKED COMPUTING ENVIRONMENT

(75) Inventor: Scott D. Redmond, San Francisco, CA (US)

(73) Assignee: Tranz-Send Broadcasting Network, Inc., San Francisco, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,743

(22) Filed: Oct. 24, 1997

(51) Int. Cl.[7] .............................................. H04L 12/64
(52) U.S. Cl. ............................ 370/354; 707/9; 707/10; 709/203
(58) Field of Search ............................... 707/9, 10, 104; 370/352, 354; 709/203, 217, 218, 219

(56) References Cited

U.S. PATENT DOCUMENTS

| 4,818,984 | A | | 4/1989 | Chang et al. ........... 340/825.54 |
|---|---|---|---|---|
| 4,845,658 | A | | 7/1989 | Gifford ........................ 364/900 |
| 5,036,518 | A | | 7/1991 | Tseung ........................ 371/32 |
| 5,077,830 | A | | 12/1991 | Mallia .......................... 455/58 |
| 5,247,664 | A | * | 9/1993 | Thompson et al. .......... 395/600 |
| 5,742,905 | A | * | 4/1998 | Pepe et al. ................... 455/461 |
| 5,826,261 | A | * | 10/1998 | Spencer .......................... 707/5 |
| 5,859,972 | A | * | 1/1999 | Subramaniam et al. 395/200.33 |
| 5,881,232 | A | * | 3/1999 | Cheng et al. ........... 395/200.47 |
| 5,884,312 | A | * | 3/1999 | Dustan et al. ................. 707/10 |
| 5,890,129 | A | * | 3/1999 | Spurgeon ........................ 705/4 |

OTHER PUBLICATIONS

"The Best WIN 95 and NT Sites, Services & Utilities" Internet Explorer Shareware Windows Sources; www.winsources.com; Oct. 1997; p. 140.

* cited by examiner

*Primary Examiner*—Melvin Marcelo
(74) *Attorney, Agent, or Firm*—Patrick J. S. Inouye

(57) ABSTRACT

A system and method for providing information dispersal in a networked computing environment are described. A plurality of database servers is distributed throughout a networked computing environment. Each database server includes a database storing segments of information staged for retrieval upon user request. A user system uploads a message specifying an information request. The information request identifies a set of the information staged on the database servers for retrieval. A central controller is communicatively interfaced to the user system and each of the database servers and controls the database servers to disperse the information requested in the uploaded message.

11 Claims, 12 Drawing Sheets

SYSTEM AND METHOD FOR PROVIDING INFORMATION DISPERSAL IN A NETWORKED COMPUTING ENVIRONMENT

BACKGROUND OF THE INVENTION

1. Field of the Invention

The present invention relates to a message broadcast system. More particularly, the present invention relates to a system and method of accepting message data from a plurality of sources and automatically uploading this data to a plurality of preselected, external database systems while controlling these database systems to reflect the information contained in the message. Particular utility of the present invention is in the prevention of receiving unsolicited email, mail and telephone calls from direct advertisers by providing a system for the automatic removal of personal identification data from the database systems of bulk mailing and marketing groups. Another utility for the present invention is for an information dispersal system by providing a system for the automatic dispersion of information and/or information request data to a plurality of preselected database systems that contain data related to the information and/or information request data; although other utilities are contemplated herein.

2. Description of Related Art

One problem that virtually every person who receives mail has experienced is receiving unsolicited advertisements or so-called "junk mail". Most people find junk mail to be time consuming and frustrating because they must sift through the unsolicited ads to get to important mail. Email users who have email accounts on the internet suffer from the same dilemma, as unsolicited email advertisements have become a highly popular method of attracting business. Again, receivers must waste valuable time reading and deleting unsolicited email while trying to read important email. Telemarketing, like bulk mailing and bulk emailing, has grown into a multi-billion dollar industry and is particularly frustrating because often telemarketers choose to telephone prospective customers at hours when customers are likely to be home (e.g., nights, weekends, etc.).

The majority of unsolicited advertisements, via mail, email, or telephone, stem from direct mail marketing groups who maintain vast databases containing thousands of individuals' personal identification (e.g., name, email address, mailing address, telephone number, etc.). These direct mail marketing groups, or "warehouses", sell customer lists to direct mail, email and telephone advertisers, where each list contains a certain number of individual personal identification data.

According to several authorities, there are over 123,000,000 postal addresses in the U.S. that receive mail from the U.S. Postal Service. Individually, an average of 41 pounds of mail are sent to every adult per year. About 44% goes unread directly into the garbage and about 93% of junk mail is ultimately discarded. The average American spends 8 full months of their life opening postal bulk mail. In addition to time waste imposed by bulk mail upon the receiver, bulk mailing has substantial environmental impacts as well. Approximately 60% of bulk mail is never read, rather, it is discarded immediately. This greatly contributes to the amount of solid waste deposited in land fills, where it is estimated that 49% of municipal solid waste is generated from paper and paper products. Thus, bulk mailing creates an individual impact in terms of frustrating time waste, and an environmental impact in terms of excess solid waste.

Producing such a vast amount of paper products used by bulk mailers also has significant environmental consequences. Dioxin, one of the most toxic substances known, is generated by paper mills which use chlorine bleaching in their process of producing PVC (polyvinyl chloride) mailers and bags, as used quite often by bulk mailers. Aside from the immediate toxicity of dioxin, the long-term affects of exposure to dioxin are now known to include an overall increase of cancer, reduced sperm count and breast cancer.

There are over 14.7 million people in the US who access on-line services. Direct mailers and bulk mailers are now using the internet to target email addresses. Junk email, or "spam", is an annoyance because the recipient must open the mail, read it and then delete the message. In addition bulk email consumes finite internet resources by consuming memory space, access time and phone line usage which in turn consumes energy and natural resources.

Bulk mailers and direct market advertisers admit that there is very little success from bulk mailing. Rather, the approach is to "blanket the market" with thousands of mailings knowing that the return is a very small percentage. One solution to prevent bulk mail, bulk email and unsolicited telephone calls is that a person can have his or her information deleted from the database of a bulk mailer or direct advertiser. However, a person must contact each of these warehouses individually to have his or her personal information removed. There are, at present, approximately 4200 such warehouses, thus, it would be virtually impossible for an individual to access all of the warehouses that contain personal data that is sold to, or used by, bulk mailers, bulk emailers and direct telemarketers. Furthermore, more and more direct marketing warehouses are appearing because of the tremendous financial value of supplying personal identification data to direct mailers and marketing groups.

Thus, there exists a need for a system that will allow a user to supply a message containing personal information such as name, address, email address and telephone number to a central controller and have the central controller automatically broadcast the message to a plurality of preselected database systems containing the personal information, and to have a central controller control these database systems to remove personal information from the database systems.

Most states have laws mandating that direct mailers and marketing groups remove personal information from their customer lists, upon request from an individual. However, as mentioned above, an individual must contact every direct mail and marketing warehouse in order to effectively remove their personal information from being accessed by bulk mailer, bulk emailers and telemarketers. Accordingly, there exists a need to allow an individual upload a request to remove personal information from a vast collection into a central controller and have that central controller upload that individuals request to a plurality of database systems, whereby the administrators of such database systems will remove that individuals personal information from the database, as required by law.

There exist many commercially available products that provide a system to remove "spam" (unsolicited email) from an email account. However these products typically employ a locally stored program that contains a locally stored list of known "spamers", where the program simply filters out any email matching the list of known "spamers". Thus, disadvantageously, any new "spamers" having new email addresses will not be filtered out. Moreover, a spamer need only change the email address to circumvent such a system. Most significantly, such systems do not solve the ultimate problem of unsolicited email because such systems fail to remove email account information from the source of the spam, i.e., marketing warehouses.

Unfortunately, none of the prior art systems discloses a system having a central controller that automatically broadcasts a user supplied message to a preselected set of external databases and control those databases to reflect information data contained in the message. Moreover, none of the prior art message broadcast systems contemplate providing a system that utilizes a centralized controller that allows customers to upload personal identification data whereby the centralized controller automatically communicates with and controls a plurality of preselected databases to remove information from those databases that matches the personal identification data. In addition, none of the prior art systems provide a message broadcast system that allows a user to upload a removal request to a central controller and have that central controller broadcast that user's removal request to a plurality of direct mail and marketing warehouses.

Another aspect of the present invention is in the dispersal of information based on a particular information request. Information access and dispersal is known in the art. For example, a user can access the internet and perform a search over the internet in an attempt to reveal sources that might contain the particular information request. Several search sites on the internet, for example, Yahoo, AltaVista, Netscape, etc. are available to users. However, such systems are most often hit-or-miss searches that require a user to spend valuable time modifying search parameters to reveal the information. Moreover, such searches are typically very broad in scope (e.g., the entire internet is searched) which usually does not give specific information that is requested, rather, most often such searches only reveal broad aspects of a particular search request.

Inherently, searching over the internet is often called "dummy" searching because internet search routines are designed to handle a broad variety of searches. These search results are rarely helpful because of the broad nature of the search and the voluminous "hits" that such searches find. Internet searches are ill equipped to handle specialized searches based on specific, targeted types of information because the internet is designed specifically for broad applicability. Thus, internet searching for specialized information is highly inefficient and most often does not provide meaningful results. Thus, there exists a need to provide specialized searching of a plurality of related database systems based on specific parameters provided by a user, thereby providing efficient and meaningful results to users who require specific information.

Prior art message broadcast systems include LAN and WAN systems that can transmit single-point-to-multiple-point data. However, none of the prior art solves the problem of targeting specific database systems for information removal and/or information request data since none of the prior art contemplates providing a centralized controller adapted to accept such data from a plurality of sources (i.e., users and customers) and have the centralized controller control a plurality of appropriate database systems to either remove the information data from the appropriate database systems, or, in the alternative, transmit the information request data to the appropriate database systems so that these database systems can provide the information requested directly back to the user or customer.

The message broadcast system of the present invention, and as described herein, is intended to be a specialized information dispersal system that provides a user with efficient, meaningful information for a variety of specialized interests. For example, the present invention can be utilized by doctors who wish to broadcast an email message containing a request to solicit responses on, e.g., the latest drug for a given disease, the latest reports on a given disease, the latest research on a disease, the latest information on treatment of a disease, and/or reporting (via message broadcast) personal research on a disease. Such a system must, of course, be in communication with appropriate database systems such as universities, hospitals, governmental agencies (e.g., CDC), doctor groups, research groups, pharmaceutical companies, etc.

The message broadcast system herein described can also be used to automatically broadcast an email message to every senator, congressman, party official, elected officials involved in a particular bill up for vote, etc., so that a user can register voting and political preference. In addition, the system of the present invention can be utilized to register conventions, seminars and/or local events and provide a system whereby users can order information related to a particular convention, seminar or local event. Other utilities are contemplated herein. For example, the present invention can be utilized as a centralized commercial transaction system whereby users (or customers) can engage in a variety of commercial transactions using the aforementioned information dispersal system of the present invention. These are just a few examples of the specialized nature of the present invention that has clear advantages over prior art information dispersal systems. To facilitate meaningful efficient information dispersal, the present invention is adapted to communicate with and control a plurality of preselected database systems that are related directly to an information request, so that resources and time are not wasted by overly broad searches that rarely provide meaningful results such as those found in the art.

SUMMARY OF THE INVENTION

Accordingly, the present invention provides a message broadcast system comprising at least one message data generator adapted to generate message data that contains preference data; at least one preselected database system; and a central controller adapted to communicate with said message data generator and said database systems to receive and store said message data from said message data generator, and to broadcast said message data to said preselected database systems to reflect said preference data contained in said message data.

One embodiment of the present invention provides a system to remove information from a plurality of remote database systems comprising a central controller adapted to communicate with at least one message data generator to receive and store at least one message containing personal identification data therein generated by said message data generator, said central controller generating control signals to control a plurality of preselected database systems to remove information matching said personal identification data from said database systems.

In method form, the present embodiment provides a method to remove personal identification data from a plurality of database systems containing such data comprising the steps of generating a message containing personal identification information therein; uploading the message into a central controller; having the central controller select a plurality of remote database systems having the personal identification data therein; connecting the central controller to the plurality of remote database systems; and controlling the plurality of remote database systems from the central controller to remove information matching the personal identification data from the database systems.

Advantageously, the system and method of this embodiment can be provided with a PIN server system in communication with a network server. The PIN server is adapted to generate a unique PIN access code to a user. The message data generator can be adapted to communicate with the PIN server via said network server and adapted to generate message data that contains the PIN access code and personal identification data related to the user of said message data generator. Also, the central controller can be adapted to communicate with the network server to receive and store the message data from the message data generator and adapted to communicate with and control the preselected database systems to remove the personal identification data from the database systems.

Another embodiment of the present invention provides an information dispersal system comprising a central controller adapted to communicate with at least one message data generator to receive and store at least one message containing information request data therein generated by said message data generator. The central controller generates control signals to control a plurality of preselected database systems to disperse information requested in the information request data back to the message data generator.

In method form, the present embodiment provides method to disperse information based on information contained in an information request comprising the steps of generating a message containing information request data therein; uploading the message into a central controller; having the central controller select a plurality of remote database systems having information related to the information request therein; connecting the central controller to the plurality of remote database systems; and controlling the plurality of remote database systems from the central controller to disperse information related to the information request from the database systems.

Advantageously, the system of this embodiment can be provided with a PIN server system in communication with a network server wherein the PIN server adapted to generate a unique PIN access code to a user. The message data generator is adapted to communicate with the PIN server via said network server and adapted to generate message data that contains the PIN access code and information request data. The central controller is adapted to communicate with the network server to receive and store the message data from said message data generator and adapted to broadcast the message data to a plurality of preselected database systems and control the database systems to disperse information related to the information request.

The aforementioned PIN server can be adapted to provide the user with a debit report and provide the central controller with a credit report. Thus, advantageously, the present invention can provide an account system for each individual user based on the PIN access code. Advantageously, the central controller can be adapted to permit user access to the central controller only after verification of the PIN access code.

In any of the embodiments described herein, the central controller is adapted to control the database systems to optimally permit information removal and/or information dispersal. Advantageously, central controller contains optimal search routines (algorithms) and removal routines, and such optimal routines are based on the type of information contained in the message data (i.e., information removal request or information dispersal request) and the specific database system which central controller will control. Thus, central controller contains a subsystem which is adapted to automatically interpret the message data for the information contained therein, determine which databases are to be controlled, and to automatically employ the optimal search and/or removal control routine based on the message data and the particular database system. Thus, advantageously, central controller is adapted to employ multiple optimal control and search and/or removal routines for a predetermined set of database systems based on the message data. Thus, the present invention provides efficient information dispersal based on particularized information request to disperse information concerning a plurality of specialized user preferences. Such a system is heretofore unseen in the art because the prior art does not provide for efficient, specialized information dispersal; nor does the prior art provide a system to remove personal identification from a plurality of preselected marketing warehouse database systems. Moreover, the information removal and/or information dispersal system of present invention has advantages over the art because the central controller is adapted to optimally control a specific set of geographically remote database systems based on stored control parameters and given message data containing an information request and/or information removal request. Such advantages are not found in the prior art.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
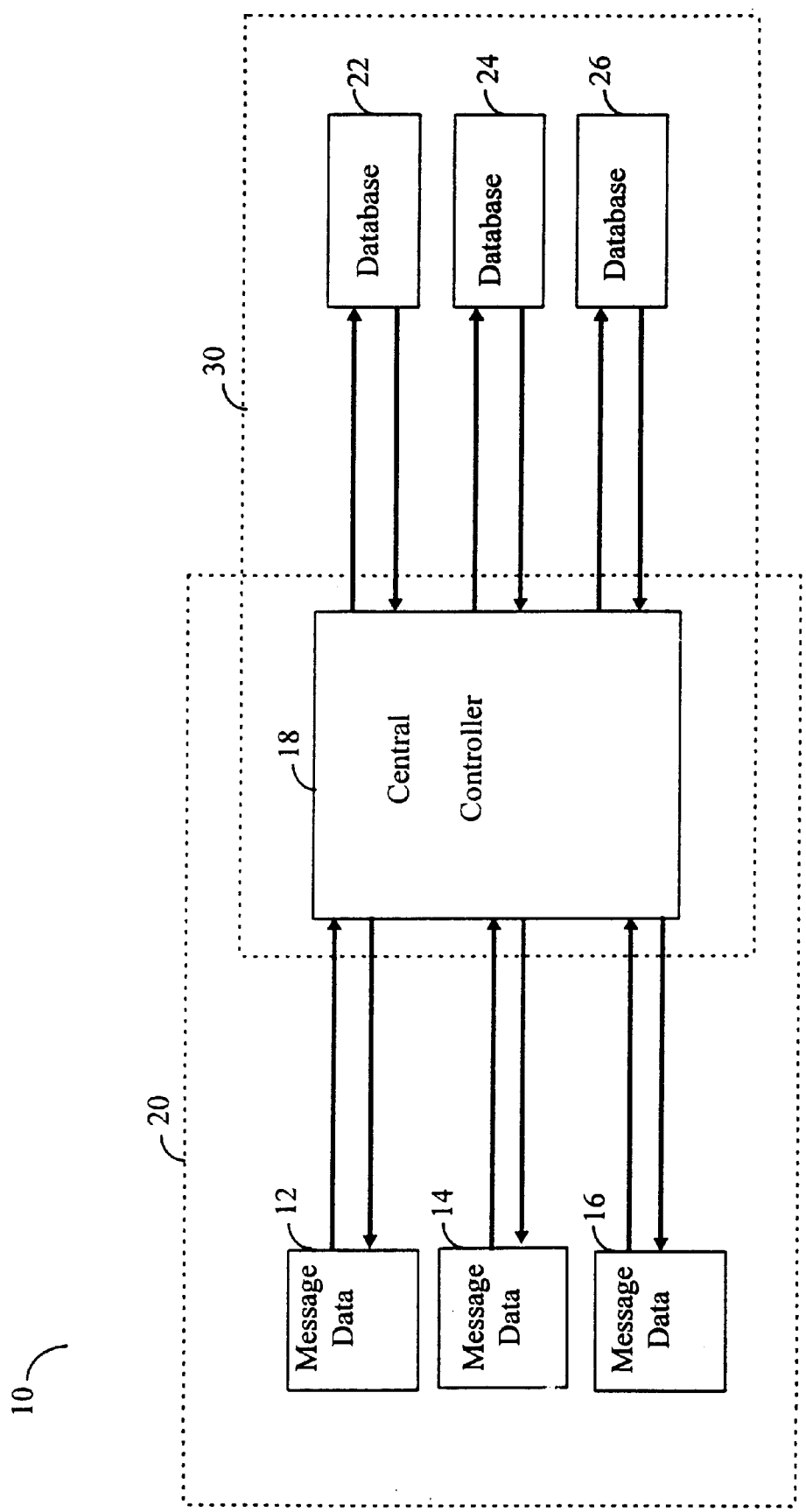
FIG. 1 is a functional block diagram of a preferred embodiment of the message broadcast system of the present invention.

FIG. 1 is a functional diagram of one preferred embodiment of the present invention. Message broadcast system 10, comprises a message data input stage 20 and message data output stage 30. Included in a preferred embodiment is at least one 12, and preferably a plurality of message data 12, 14, 16, a central controller 18 and at least one 22, and preferably a plurality of database systems 22, 24, 26. Central controller 18 receives message data 12, via a communications interface, and automatically communicates with and controls database 22 to remove and/or disperse information from database 22 that matches information contained in the message data 12. Preferably, system 10 provides an automated central controller 18 to automatically communicate with and control a plurality of databases 22, 24, 26 upon being supplied with message data 12 from a user. Each of these functional components of the present embodiment will be more fully described below.

It should be understood at the outset that message broadcast system 10, in its broadest sense, operates both as an information removal system and an information dispersal system. Operating as an information removal system 10, message data 12 can be personal identification data (e.g., name, address, email address, phone number, etc.) that is supplied by a user to the central controller 18 and central controller communicates with and controls selected database systems 22 to remove personal identification data therefrom. Included in message data 12 is a request to have the personal identification data removed from systems 22 that supply bulk mailers, bulk emailers and telemarketers with this information. Thus, preferably, database systems 22 are marketing warehouse systems used by bulk mailers, bulk emailers and telemarketers. Database systems 22 are selected by the central controller 18 based on the content of the message data, i.e., a request to have an email address, postal address or phone number, or all of the above, removed from the marketing warehouse systems 22.

Operating as an information dispersal system 10, message data 12 can be information request data that is supplied by a user to the central controller 18 and central controller communicates with and controls selected database systems 22 to disperse information related to the information request data from the database systems 22 back to the user. While not wishing to be bound by example, information request data (message data) 12 can be a request for information related to a professional organization (e.g., medical, legal, engineering, etc.), trade organization (e.g., electricians, plumbers, technicians, etc.), civic activities (e.g., voting preference, government actions/bills, etc.), community activities (e.g., conventions, events, etc.), commercial activities (e.g., business transactions, etc.) or any other particularized request for information. Accordingly, database systems 22 are database systems that contain such information and are selected by the central controller 18 to forward the information to the user in response to the information request. Thus, for example, a physician can upload a request for information (message data 12) on the latest drug for a disease and/or the latest report on a disease and/or latest research on a disease into the central controller 18 to have the central controller 18 automatically communicate with and control a plurality of preselected database systems 22 to forward information in response to the request.

Unless otherwise stated herein, message data 12 shall be understood to comprise information request data and/or personal identification data. Accordingly, database systems 22 shall be understood to be related to the given message data 12.

Figure 2:
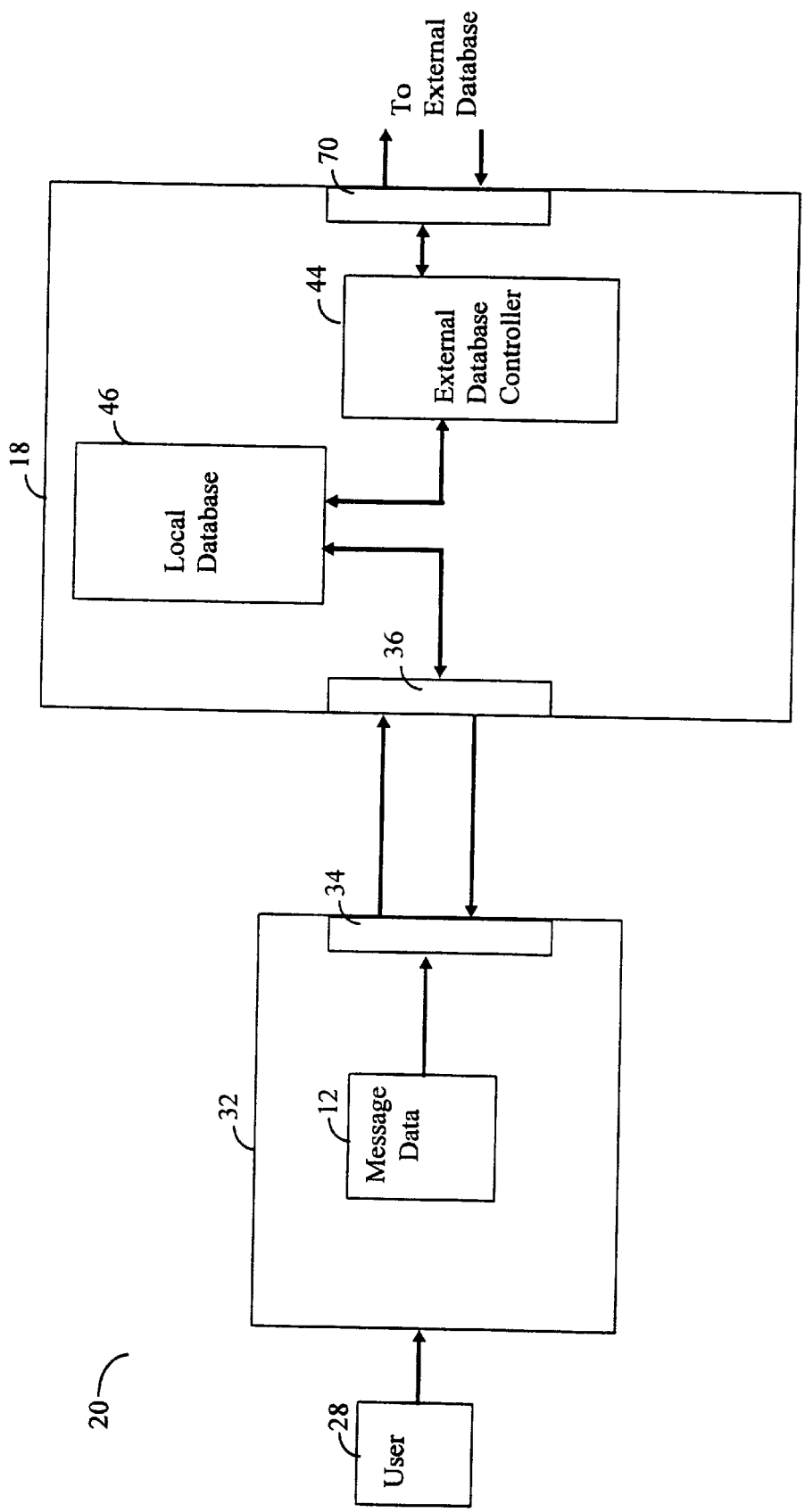
FIG. 2 is a functional block diagram of a message data input stage of the preferred embodiment of FIG. 1.

Referring to FIG. 2, message input stage 20 of FIG. 1 is depicted. Message data 12 is generated by a message data generator 32. Message data generator 32 can be a personal computer, email terminal, or the like, or any other means of generating a text message containing personal information. In a preferred embodiment, message data generator 32 is a personal computer used by a customer or user 28 at a remote location. Although not shown, message data generator 32 also includes processor, memory, input devices, monitor, and anything else associated with a personal computer. Message data generator 32 also includes a communication interface 34 to communicate with the central controller 18. In a preferred embodiment, communication interface 34 is a network server interface which permits the user to access the network (e.g., world wide web) and includes email transmissions network communication protocol. Communication interface could also be a direct dial-up interface via a modem (not shown). Of course, if communication interface 34 is an network server interface, message data generator 32 also includes (not shown) an appropriate web browsing and/or email messaging tool, as are known in the art (e.g. Netscape™, Internet Explorer™, etc.). As mentioned above, a customer or user 28 supplies message data, via message data generator 32. Message data 12 is input into central controller 18, via communication interface 34, as will be described below.

Central controller 18 preferably includes a local database 46, an external database controller 44 and at least one communication interface 36 and 70 to communicate with message data generator 32 and external database systems 22, respectively. It is important to note at the outset that, although not shown in the figures, central controller 18 and message data generator 32 can communicate directly, via a direct modem link over communication interface 34 and 36. Preferably, the communication takes place virtually over an external network server, for example, America On-Line™ or ISP (internet service provider), each of which can be controlled by central controller 18. Of course, to communicate over the network, communication interface 34 and 36 must be appropriately configured for internet protocol, e.g., TCP/IP internet protocol. Thus, for example, communication interface 36 comprises a TCP/IP network interface to communicate with a network server. Message data 12 originating from at least one, but preferably a plurality of remote message data generators 32, is uploaded into central controller 18 and stored in local database 46. In the preferred embodiment, message data 12 is uploaded to central controller 18 via, as described above, an network server system. In addition, network server, controlled by central controller 18, can provide a user interface to simplify and facilitate message data 12 input from a user 28 (described below).

Upon receiving message data 12, central controller stores the message data 12 in local database 46.

Figure 3:
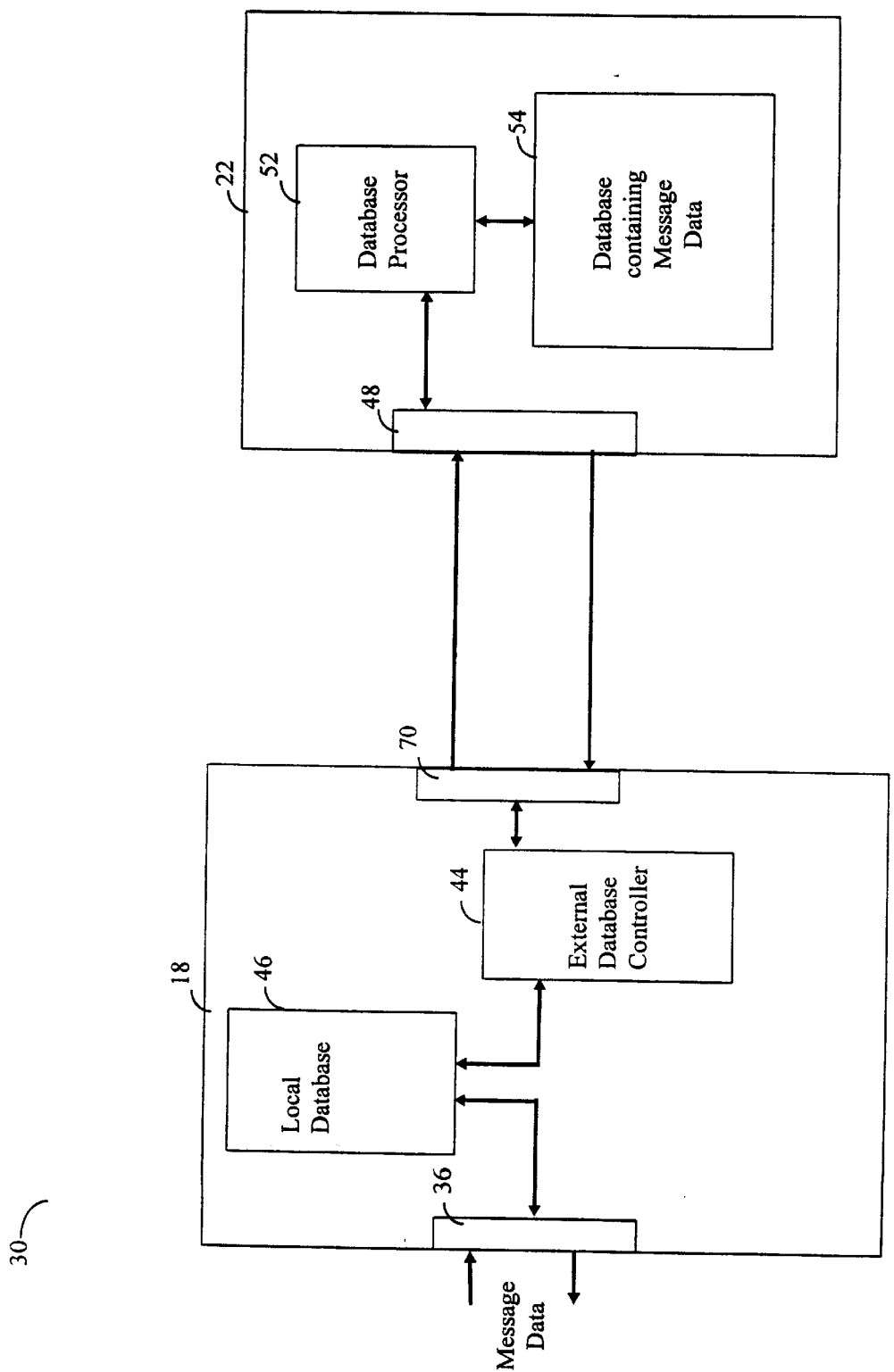
FIG. 3 is a functional block diagram of a message data output stage of the preferred embodiment of FIG. 1.

Referring to FIG. 3, the message data output stage 30 of FIG. 1 is depicted. Message data output stage 30 is primarily directed to communication with and control of database 22 by central controller 18. Database 22 typically comprises a database processor 52, a communication interface 48 and a database containing message data 54. Of course, database 22 also comprises associated hardware and software (not shown) associated with database 22. Preferably, database 22 is one of a plurality of remote databases that can be communicated with and controlled by central controller 18. Also, preferably database 22 is a preselected database who's identity is stored by central controller 18 on the local database 46. Upon receiving and storing message data 12 (described above), central controller 18 initiates communication with database 22, via communication interface 70 and 48.

External database controller 44 is a device that is adapted to communicate with and control the external database systems 22. At its most basic level, external database controller is coupled to a local database 46 and a communication interface 70. In operation, message data 12 is uploaded into central controller 18 and stored on local database 46. Upon receiving the message data 12, local database 46 is appropriately configured to initiate communication with external database controller 44. Likewise, external database controller initiates communication with the external database systems 22, via communications interface 70 and 48. External database controller 44 contains appropriate hardware and/or software to control database 22. External database controller 22 reads message data 12 contained in local database 46 and, via communication interface 36, initiates control signals to search database 54 for matching data contained in message data 12. Although not shown, it is understood by those skilled in the art that local database 46 contains data related to each external database 22. This data preferably includes communications protocol, control data, handshaking protocol, and other information used by external database controller 44 to communicate with and control each of the preselected database. Of course, to contain such data, local database must be appropriately programmed by an administrator of central controller 18, as is understood by those skilled in the art.

As described above, communication between central controller 18 and database 22 can be initiated over a direct point-to-point link (e.g., via modem) and/or by a virtual connection over a network server. Of course, communication interface 36 and 48 must be appropriately configured to communicate in such a fashion. Central controller 18 is adapted to communicate over both mediums, depending on the particular requirements of database 22.

Figure 5:
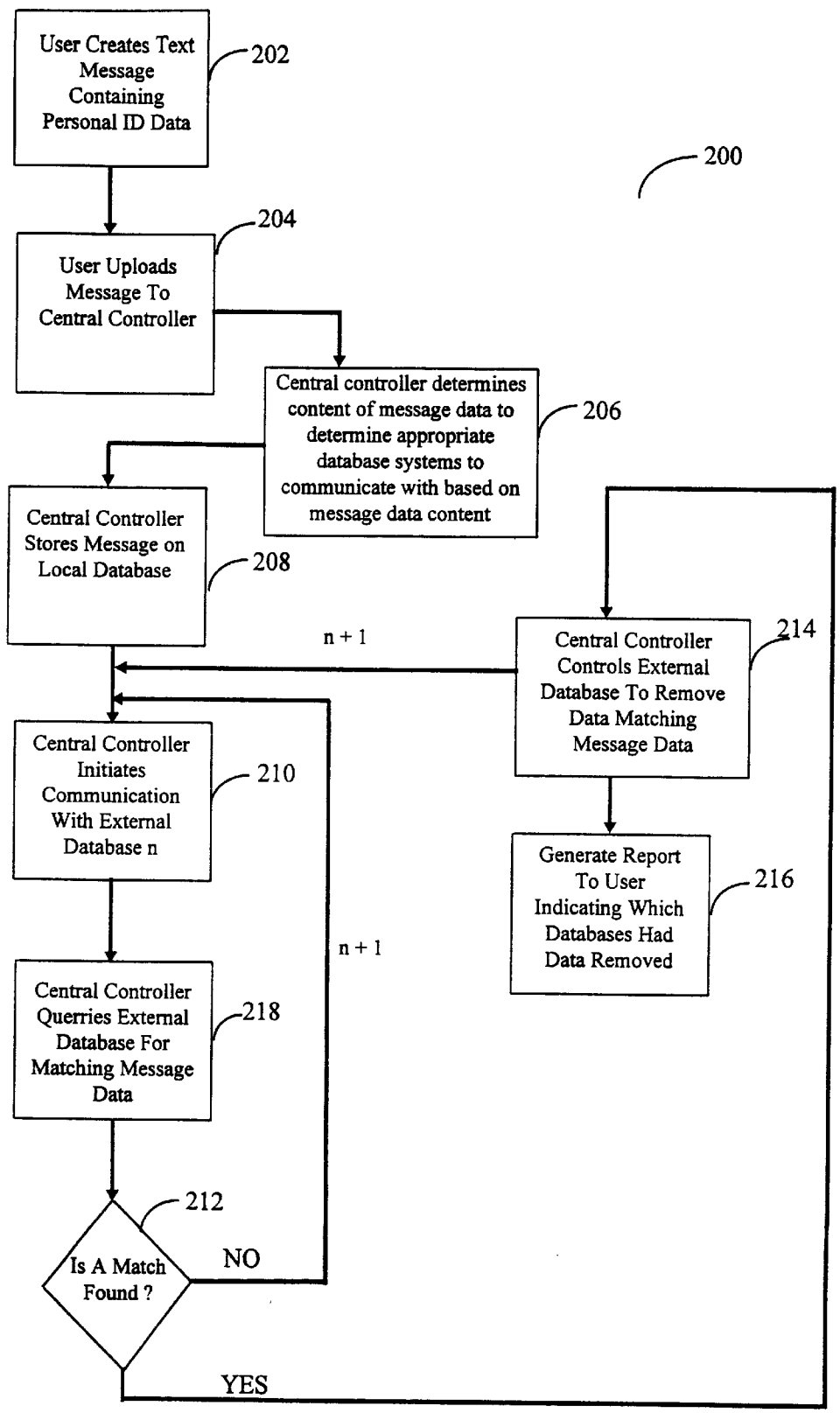
FIG. 5 is a flowchart illustrating the operational flow of another preferred embodiment of FIG. 1.

FIG. 5 is a flow chart 200 illustrating the operational flow of the above-described information dispersal system of the embodiments shown in FIGS. 1–3. Reference shall be made to above-described components without corresponding numbering. The system 100 begins by a user creating a text message containing information request data 102. The user uploads the message to the central controller 104, and the central controller stores this message on the local database 108. Upon receiving the message data 12, central controller determines the content of the message data to determine appropriate database systems to communicate with based on the particular information requested 106. Upon receiving and storing the message, central controller initiates communication with an external (remote) database n 110. Central controller queries database n, via control signals initiated by central controller, for information matching the information request 118. Central controller, and more specifically, external database controller determines if a match is found between the user-supplied information request and data contained in the external database 112. If a match is not found, external database controller initiates communication to another preselected database n+1. If a match is found, central controller controls the external database, based on control signals initiated by the external database controller, to disperse information in that database matching the information request 114. Preferably, the information is dispersed directly back to the user, either in hard copy format or in electronic format that can be accessed directly on the message data generator. Alternatively, the information can be dispersed to central controller and stored there until retrieved by the user. Central controller then initiates communication to another preselected database n+1, and the above process repeats. Central controller generates a report to user indicating which databases have dispersed information found 116.

Figure 4:
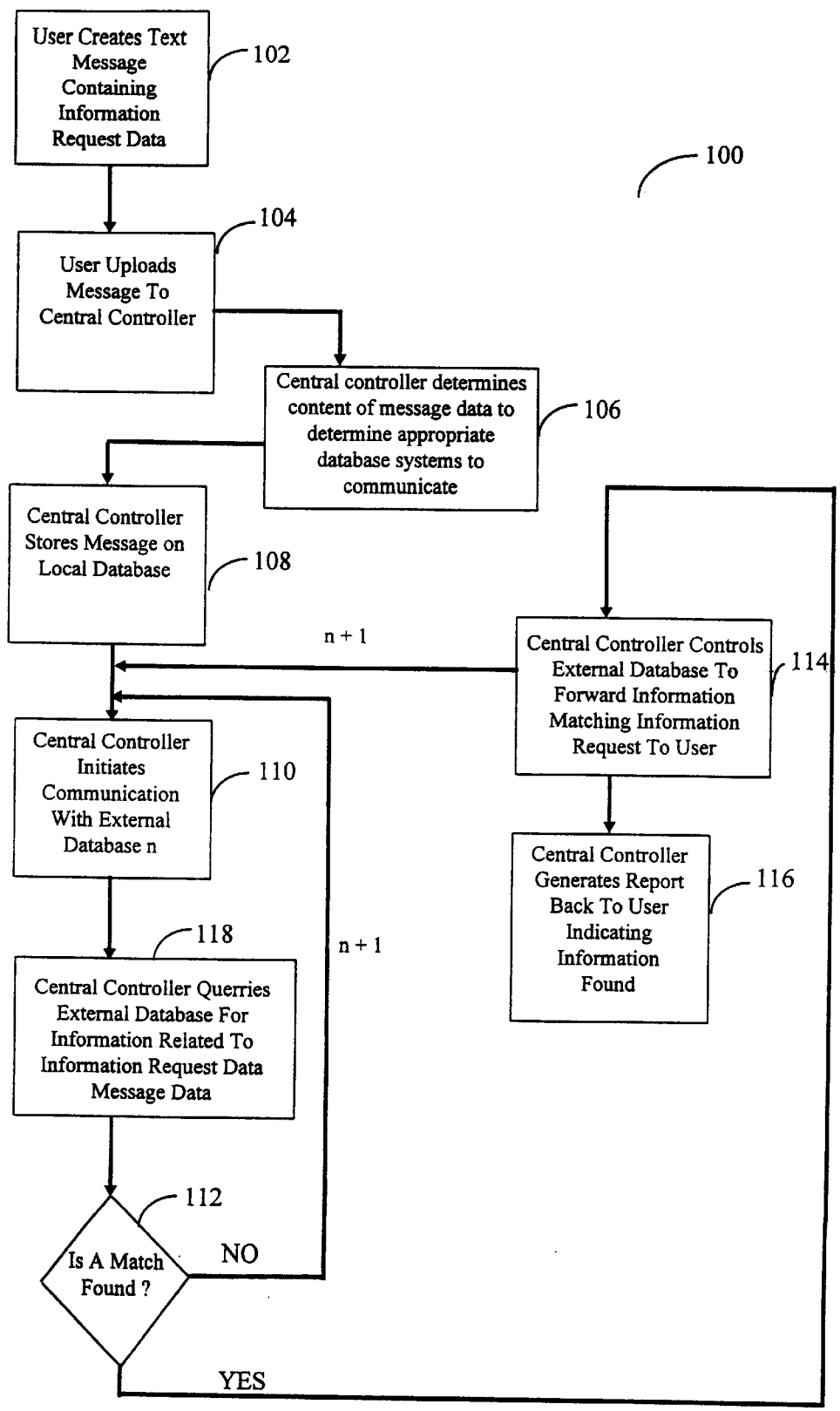
FIG. 4 is a flowchart illustrating the operational flow of one preferred embodiment of FIG. 1.

FIG. 4 is a flow chart 100 illustrating the operational flow of the above-described personal identification information removal system of the embodiments shown in FIGS. 1–3. Reference shall be made to above-described components without corresponding numbering. The system 200 begins by a user creating a text message containing personal ID data 202. The user uploads the message to the central controller 204, and the central controller stores this message on the local database 208. Upon receiving the message data 12, central controller determines the content of the message data to determine appropriate database systems to communicate with based on the particular personal identification to be removed 206. Upon receiving and storing the message, central controller initiates communication with an external (remote) database n 208. Central controller queries database n, via control signals initiated by central controller, for matching message data 210. Central controller, and more specifically, external database controller determines if a match is found between the user-supplied message data and data contained in the external database 212. If a match is not found, external database controller initiates communication to another preselected database n+1. If a match is found, central controller controls the external database, based on control signals initiated by the external database controller, to remove information in that database matching the personal identification data 214. Central controller then initiates communication to another preselected database n+1, and the above process repeats. Central controller generates a report to user indicating which databases had data removed 216.

In another embodiment, and again referring to FIGS. 1–3, the message broadcast system 10 comprises a central controller, a plurality of remote, external databases 22, 24, 26, and a plurality of message data 12, 14, 16 generated by a plurality of users 28. In this embodiment, message data 12 includes preference data or request data indicating the users' preference of having the personal information contained in the message data removed from the database 22. User 28 generates message data 12 and uploads message data 12 into central controller 18, as in the previous embodiment. Central controller 18 initiates communication with database 22 and uploads message data into database 22. As in the previous embodiment, the process repeats for the next preselected database. However, central controller does not control the database systems, rather an administrator (not shown) of database system 22 removes personal identification data contained in message data from database 22, in accordance with the request or preference indicated in message data 22.

Figure 6:
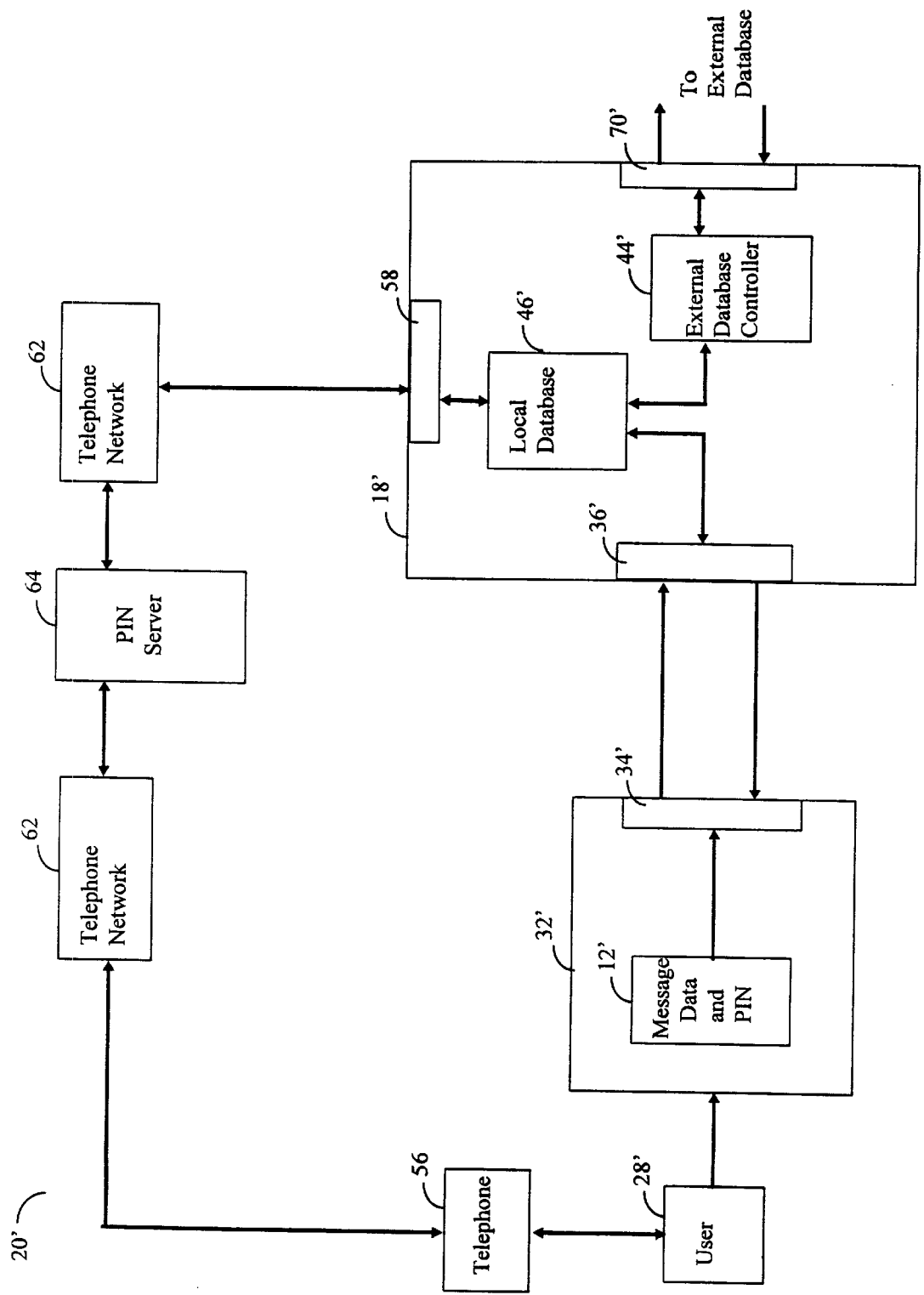
FIG. 6 is a functional block diagram of another embodiment of a message data input stage of FIG. 1.

Referring to FIG. 6, another embodiment of the message data input stage 20' of the present invention is depicted. Its elements operate essentially the same as the message data input stage 20 of the previous embodiment. Additionally, however, message data input stage 20' provides a PIN server 64, operable over a telephone network 56 via a standard telephone 56. At its most basic level, PIN server generates a unique PIN access code to each user. The user includes the unique access code when accessing central controller 18' to upload message data 12'. Thus, central controller 18' acts as a subscription service system and is available only to users who have valid PIN access code. Each of these functional components will be described below.

PIN server 64 is a remote server typically operated by long distance service providers (e.g., AT&T, Sprint, MCI, etc.) or by local exchange carriers (e.g., NYNEX, etc.) and is generally a random number generator adapted to communicate with both user 28' and central controller 18'. PIN server 64 essentially has two functional components associated with it: PIN server access from a user 28' and PIN server access, update and administration from the central controller 18'. In operation, user 28' accesses PIN server 64 by dialing a particular access number (e.g., 900#) over a standard telephone 56. PIN server 64 queries user 28' by preferably using an interactive voice response (IVR) system. Typically, user 28' is requested by PIN server 64 to supply personal information to ensure security, PIN server 64 then issues a unique PIN access code number to that user. In addition, PIN server is configured, via the local exchange carrier, to issue a debit to the user's monthly phone record and to issue a corresponding credit report to the central controller 18'. In this regard, PIN server 64 can be adapted to provide various levels of services based on the user's preference (i.e., a user can be provided with more services by increasing the debit). The various levels of services offered can be administered and controlled by central controller 18'.

Using the PIN access code issued by PIN server 64, user 28' inputs message data and PIN number 12' using the message data generator 32', as in the previous embodiment. User 28' uploads message data and PIN 12', via communication interface 34' and 36', into central controller. Of course, as in the previous embodiment, communication interface 34' and 36' can be a direct communication or a virtual connection over a network server (internet). Message data and PIN 12' is stored on local database 46'.

The central controller 18' of this embodiment also includes a telephone network interface 58 adapted to communicate with and control PIN server 64 aver a standard telephone network 62. Central controller 18' routinely accesses PIN server 64 to get pertinent information regarding the status of PIN server, for example, PIN access codes issued, customer (or user 28') account information, customer personal identification data, etc. This status information is stored on local database 46' and is used by central to compare against the information contained in message data 12' to ensure that the person sending the message data 12' is the individual who is granted access to the central controller 18'. Central controller 18' also controls PIN server 64 to facilitate updates and other control functions associated with PIN server 64. For example, central controller 18' is appropriately configured to control PIN server 64 to set operational parameters (e.g., user-level access, communication protocol, etc.) and to control various security parameters with the PIN server, as is known in the art. To facilitate communication and control of PIN server, central controller 18' also has an administration system (not shown) appropriately configured to administer and control both the central controller 18' and the PIN server 64.

As mentioned above, in this embodiment local database 46' stores both message data and PIN 12' and customer account information. To ensure security, local database checks the information in the message data and PIN access code 12' supplied by user 28' against the customer account information supplied by PIN server 64. If a correct match is found, central controller initiates communication with external database system 22, via communications interface 70', in accordance with the previous embodiments.

Figure 7:
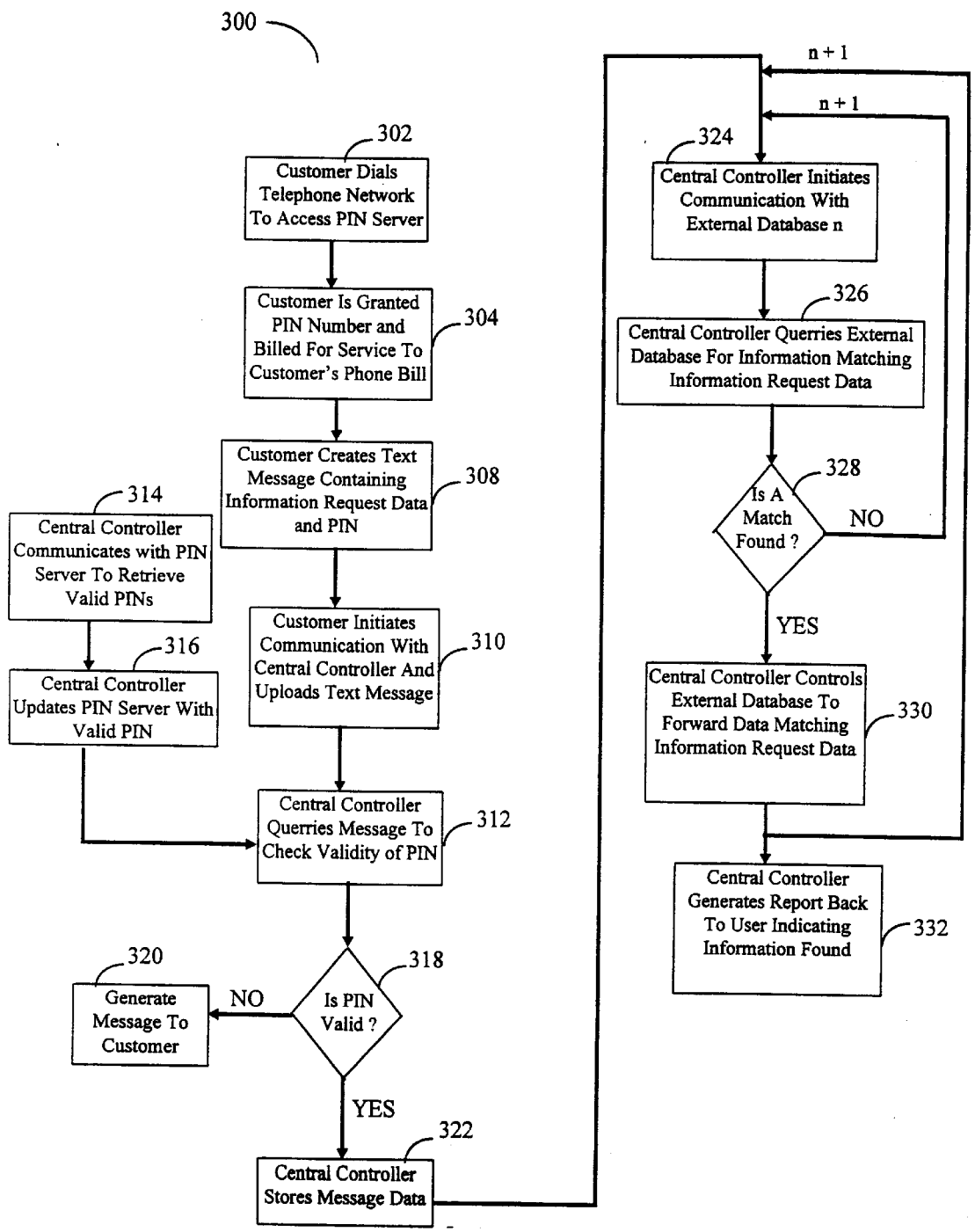
FIG. 7 is a flowchart illustrating the operational flow of one preferred embodiment of the message data input stage of FIG. 6.

FIG. 7 is a flow chart 300 illustrating the operational flow of the information request system of the above-described embodiment of FIGS. 3 and 6. Reference will be made to above-described components without corresponding numbering. Customer dials the appropriate access number over a telephone network to access the PIN server 302. After supplying PIN server with customers' identification information, PIN server grants customer a unique PIN access code 304. PIN server also generates a debit bill for service directly to customers phone bill, typically generated by a local exchange carrier 304. With knowledge of the PIN granted by PIN server, customer creates a text message containing information request data and PIN access code 308. Customer initiates communication with central controller and uploads text message to central controller 310. At periodic intervals, central controller communicates with the PIN server to retrieve valid PIN access codes issued by PIN server for comparison 314. Central controller updates the PIN server with current data of valid PIN access codes to ensure that no code is used more than once for a given transaction 316. Central controller compares text message against information supplied by PIN server to validate the PIN account based on personal identification data contained in the text message 312. If the comparison is not valid 318, indicating either that customer has supplied the wrong PIN number or the personal identification associated with the PIN number does not match, central controller generates a message (e.g., email) to customer indicating current status 320. If a match is found 318, central controller stores message data (i.e., personal identification data) in the local database 322. In a similar fashion of the previous embodiment of FIG. 4, upon receiving and storing the message, central controller initiates communication with an external (remote) database n 324. Central controller queries database n, via control signals initiated by central controller, for information matching the information request 326. Central controller, and more specifically, external database controller determines if a match is found between the user-supplied information request and data contained in the external database 328. If a match is not found, external database controller initiates communication to another preselected database n+1. If a match is found, central controller controls the external database, based on control signals initiated by the external database controller, to disperse information in that database matching the information request 330. Central controller then initiates communication to another preselected database n+1, and the above process repeats. Central controller generates a report to user indicating which databases have dispersed information 332.

Figure 8:
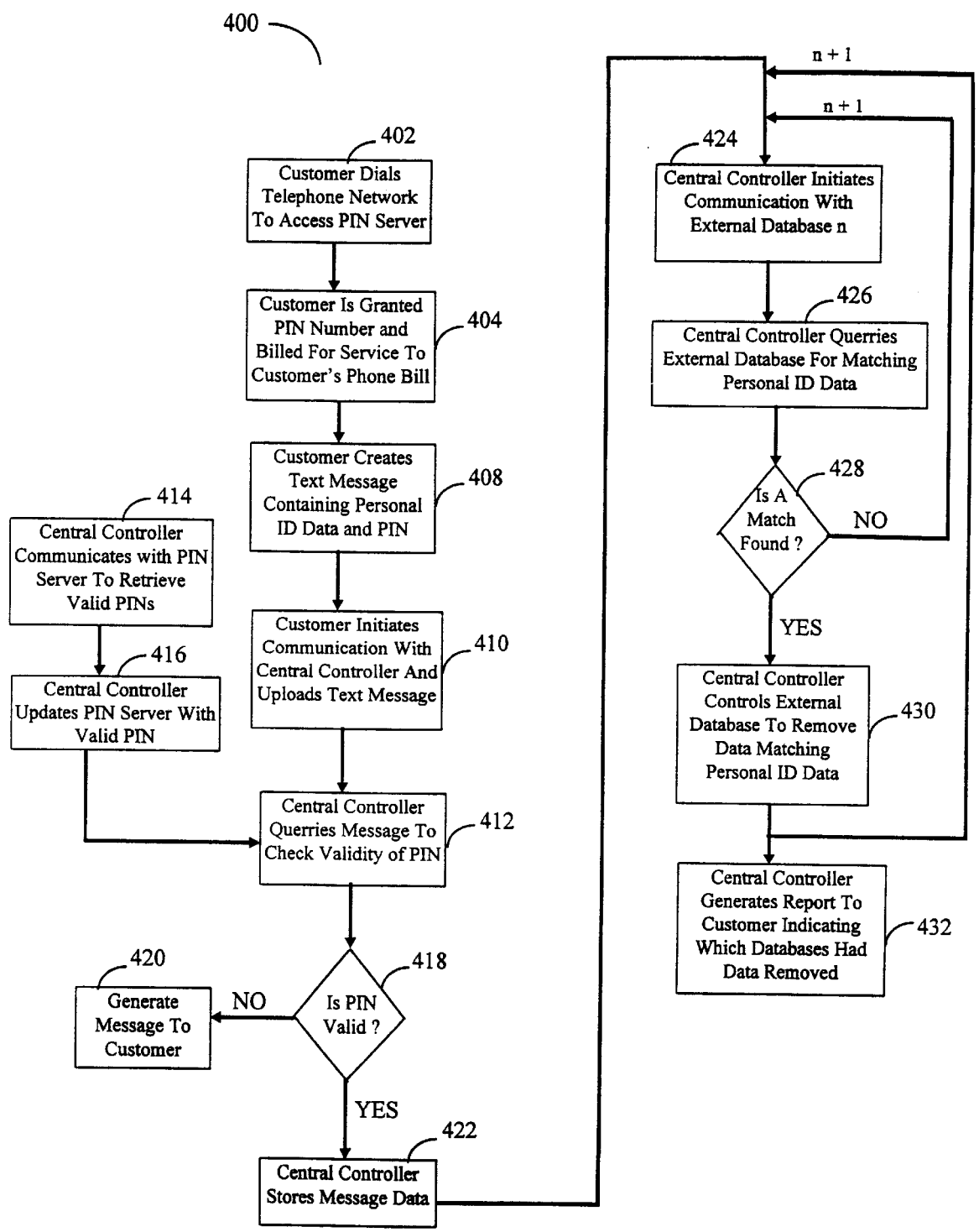
FIG. 8 is a flowchart illustrating the operational flow of another preferred embodiment of the message data input stage of FIG. 6.

FIG. 8 is a flow chart 400 illustrating the operational flow of the information removal system of the above-described embodiment of FIGS. 3 and 6. Reference will be made to above-described components without corresponding numbering. Customer dials the appropriate access number over a telephone network to access the PIN server 402. After supplying PIN server with customers' identification information, PIN server grants customer a unique PIN access code 404. PIN server also generates a debit bill for service directly to customers phone bill, typically generated by a local exchange carrier 404. With knowledge of the PIN granted by PIN server, customer creates a text message containing personal identification data and PIN access code 408. Customer initiates communication with central controller and uploads text message to central controller 410. At periodic intervals, central controller communicates with the PIN server to retrieve valid PIN access codes issued by PIN server for comparison 414. Central controller updates the PIN server with current data of valid PIN access codes to ensure that no code is used more than once for a given transaction 416. Central controller compares text message against information supplied by PIN server to validate the PIN account based on personal identification data contained in the text message 412. If the comparison is not valid 418, indicating either that customer has supplied the wrong PIN number or the personal identification associated with the PIN number does not match, central controller generates a message (e.g., email) to customer indicating current status 420. If a match is found 418, central controller stores message data (i.e., personal identification data) in the local database 422. In a similar fashion of the previous embodiment of FIG. 5, upon receiving and storing the message, central controller initiates communication with an external (remote) database n 424. Central controller queries database n, via control signals initiated by central controller, for information matching the personal identification data 426. Central controller, and more specifically, external database controller determines if a match is found between the user-supplied information request and data contained in the external database 428. If a match is not found, external database controller initiates communication to another preselected database n+1. If a match is found, central controller controls the external database, based on control signals initiated by the external database controller, to remove information in that database matching the personal identification data 430. Central controller then initiates communication to another preselected database n+1, and the above process repeats. Central controller generates a report to user indicating which databases had data removed 432.

Figure 9:
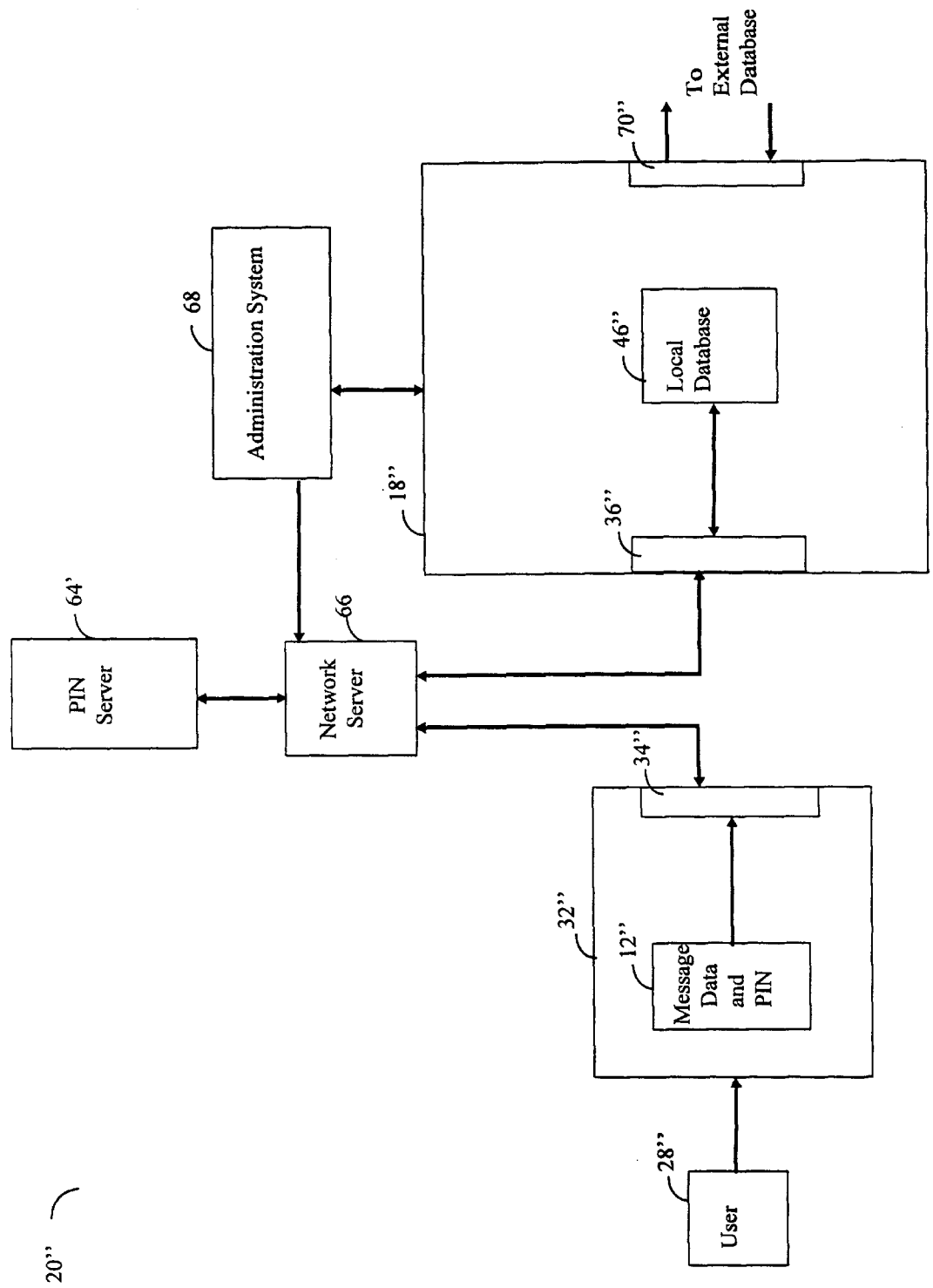
FIG. 9 is a functional block diagram of another embodiment of the message data input stage of FIG. 1.

Referring to FIG. 9, another embodiment of the message data input stage 20" of the present invention is depicted. Its elements operate essentially the same as the message data input stage 20 and 20' of the previous embodiments. Additionally, however, message data input stage 20' provides a network server 66 and an administration system 68, as will be described below. It is to be understood that, although not shown in FIG. 9, central controller 18" incorporates all of the essential elements as in the previous embodiments, i.e., external database controller 44, 44'. At its most basic level, this embodiment provides a system to permit user 28" to contact network server 66, access PIN server 64' through the network server 66, and upload message data and PIN access code 12" to central controller 18" directly from the network server 66. Thus, unlike the previous embodiment, customer 28" need not make a separate telephone call to the PIN server 64', rather, customer 28" can receive a PIN access code and upload message data all on the network server 66, as explained below.

In this embodiment, customer 28", via massage data generator 32", communicates with network server 66 to facilitate creation and uploading of message data and PIN access code 12". Network server 66 can be a remotely hosted internet site, web page, or the like, that is controlled and maintained by central controller 18". Of course, communication interface 34" is appropriately configured to allow message data generator to communicate with network server 66. For example, if network server 66 is a remotely hosted web page, communication interface 34" is appropriately configured to interactively communicate with the web page, e.g., via TCP/IP and/or FTP (file transfer protocol).

Network server 66 is appropriately configured to provide customer 28" with the following functions: interactive text communication (e.g., email), access to PIN server to obtain a PIN account and direct uploading of message data and PIN access code 12" to central controller 18". In addition, network server 66 communicates with PIN server 64' to dynamically update PIN server 64' directly from the network server 66. For example, customer 28" in this embodiment can change or alter PIN access code data and accompanying message data. Also, the customer 28" can access PIN server 64' to obtain PIN access code, create message data (including PIN access code) and upload this information directly to central controller 18" all in one step. Of course PIN server 64' can be appropriately configured to generate a debit report directly to the user's 28" telephone bill. Or, PIN server 64' can be appropriately configured to accept debit financial transaction directly on the network server 66 (e.g., customer 28" supplies the network server 66 with a credit card account number). PIN server also 64' generates a credit report to central controller and credits an account that is set up on PIN server 64' having the central controller 18' as the beneficiary of the funds received.

Similarly, central controller 18" connects to network server 66 via appropriately configured communication interface 36". However, central controller 18" is the controller of network server 66, and thus, unlike user 28", is granted full access and control over network server 66 and PIN server 64'. To facilitate control and maintenance of network server 66, PIN server 64' and central controller 18", an administration system 68 is provided. Administration system 68 provides an administrator (not shown) access to local database 46" for local programming and administrative functions. Also, administrative system 68 connects to network server to program and administer network server 66 and provide customer 28" parameters, PIN server access and programming and general localized control over network server, as is known in the art. Only central controller 18", via administration system 68, has the ability to change parameters of the network server 66 and PIN server 64', thus, central controller has global control over network server 66 and PIN server 64' to set parameters for customer-level access.

Once the message data has been received by central controller 18", central controller 18" initiates communication to external database 22, to upload and/or control external database system 22 in accordance with the previous embodiments of the message data output stage 30 of the present invention as depicted in FIG. 3.

Figure 10:
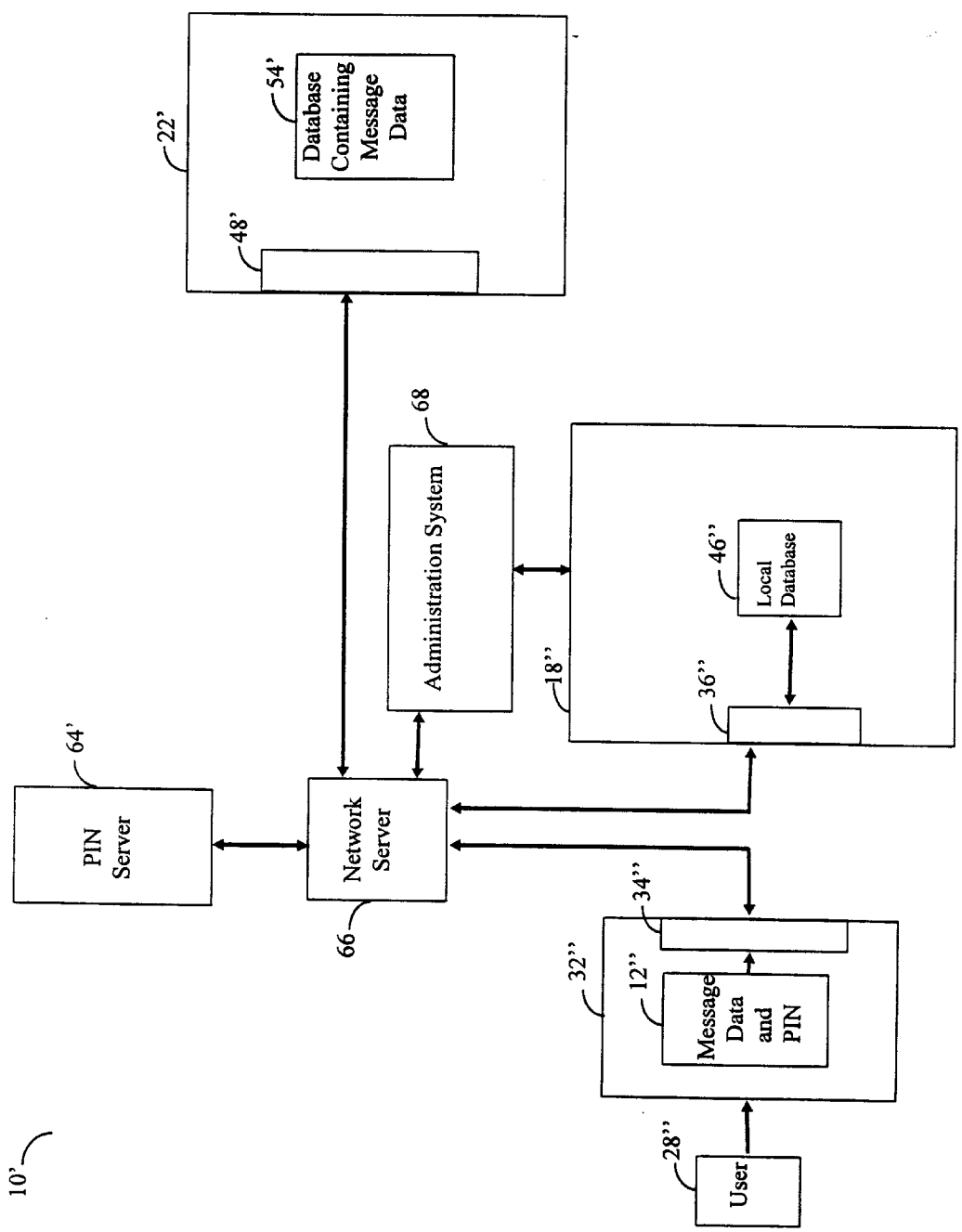
FIG. 10 is a functional block diagram of another embodiment of the message broadcast system of the present invention.

FIG. 10 depicts another embodiment of the message broadcast system 10' of the present invention and includes communication between central controller 18", message data generator 32" and database systems 22' entirely over a network server 66. Message data input stage 20" of FIG. 9 (described above) is incorporated into FIG. 10. In this embodiment, communication interface 48' of database system 22' is adapted to communicate with the network server, as described above with reference to communication interface 34" and 36". Accordingly, communication interface 36" of central controller 18" is appropriately configured to permit communication and control of database systems 22 directly over the network server. Moreover, in this embodiment, and with particular reference to the information dispersal system of the present invention, database system 22' can be appropriately controlled by the central controller 18" to forward information directly to the message data generator over the network server 66, without having to pass through the central controller 18".

Figure 11:
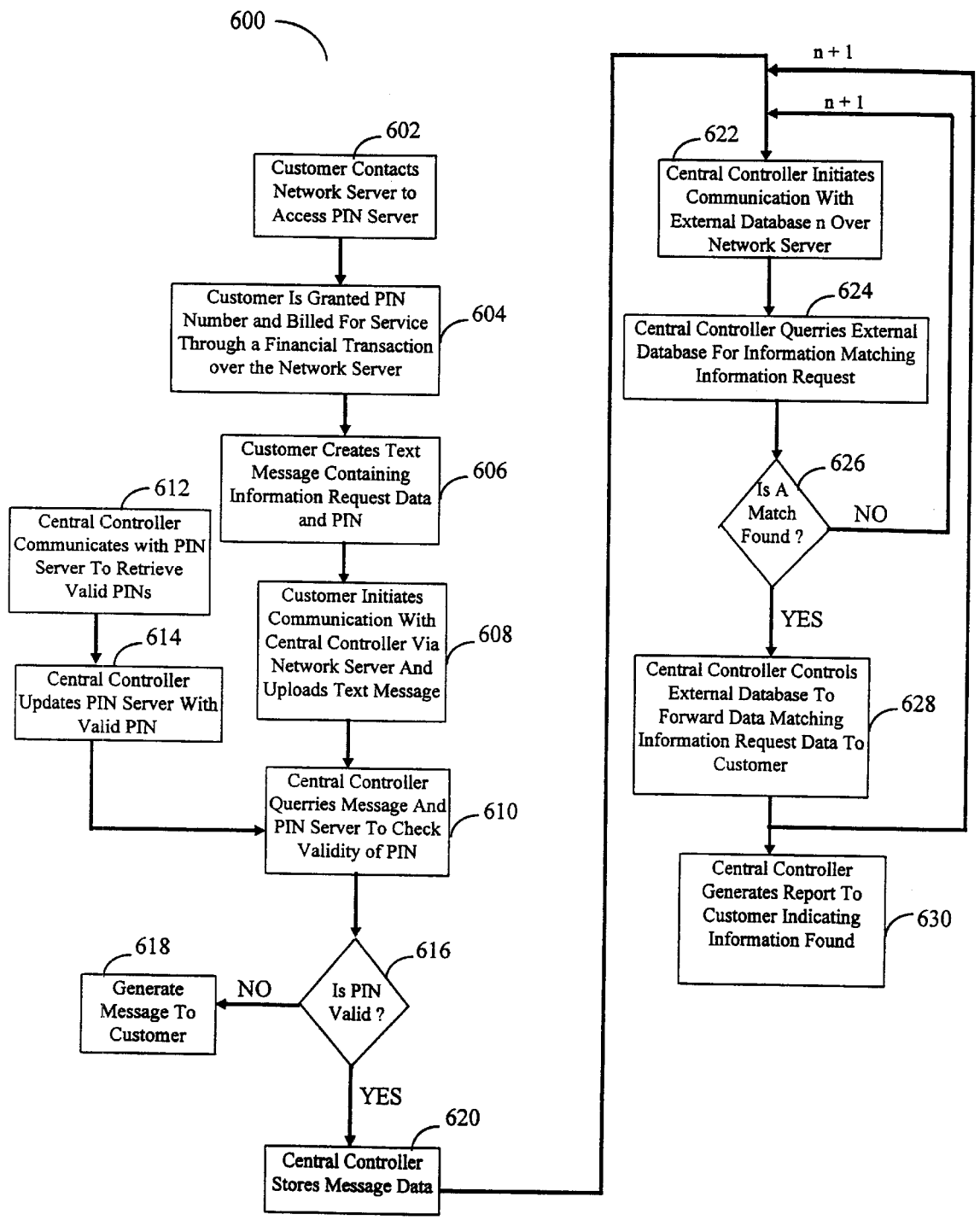
FIG. 11 is a flowchart illustrating the operational flow of one preferred embodiment of FIG. 10.

FIG. 11 is a flow chart 600 illustrating the operational flow of the information dispersal system of the above-described embodiment of FIG. 10. Reference will be made to above-described components without corresponding numbering. Customer contacts network server to access the pin server 602. Through interactive communication over the network server, customer is granted a unique PIN access code 604. PIN server also generates a debit bill for service directly to customer's phone bill or by a financial transaction over the network server 604. Customer creates a text message, either locally on the message data generator or virtually on the network server, that includes the PIN access code granted by PIN server and information request data 606. Customer initiates communication with central controller and uploads text message to central controller 608. Because network server is in communication with central controller, preferably, network server automatically forwards the text message to central controller. Thus, customer preferably need not make a separate communication with central controller, rather network server provides a direct on-line connection to central controller via, e.g., a web page server. Upon receiving the text message, central controller compares text message to information supplied by PIN server to validate the PIN account based on personal identification data contained in the text message 610 (i.e., using PIN server access and updating 612 and 614, respectively). If the comparison is not valid 616, indicating either that customer has supplied the wrong PIN number or the personal identification associated with the PIN number does not match, central controller generates a message (e.g., email) to customer indicating current status. If a match is found, central controller stores message data in the local database 620. Upon receiving and storing the message, central controller initiates communication with an external (remote) database n 622 over the network server. Central controller queries database n, using control signals supplied by central controller over the network server, for information matching the information request data 624. Central controller, and more specifically, external database controller determines if a match is found between message data and data contained in the external database 626. If a match is not found, external database controller initiates communication to another preselected database n+1. If a match is found, central controller controls the external database (over the network server), based on control signals initiated by the external database controller, to disperse information in that database matching the information request data 628. Moreover, central controller controls the database to disperse the appropriate information directly over the network server to the message data generator (and, ultimately, to the customer). External database controller then initiates communication to another preselected database n+1, and the above process repeats. After all of the preselected external databases are contacted by central controller, central controller generates a report to user indicating which databases dispersed information 630.

Figure 12:
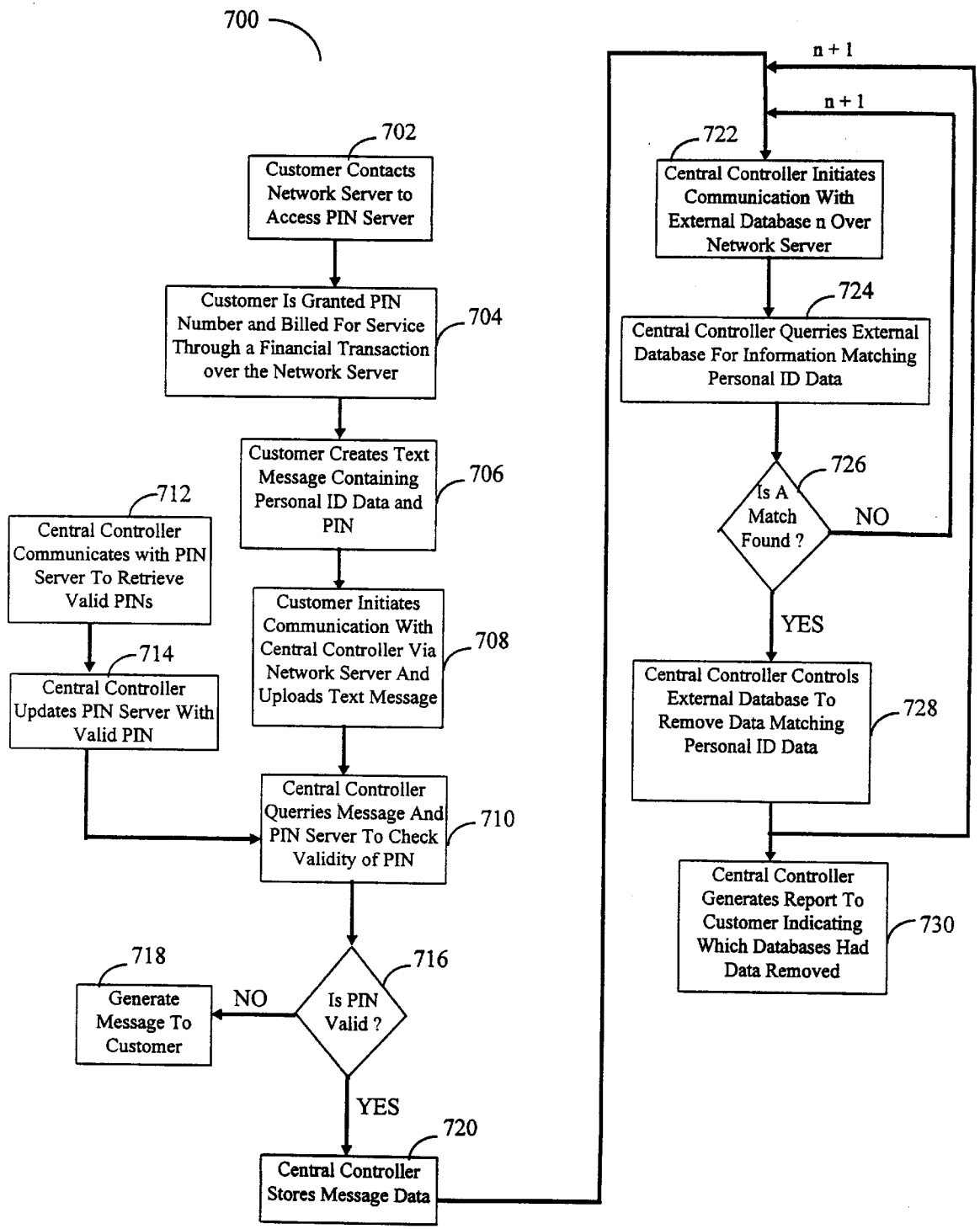
FIG. 12 is a flowchart illustrating the operational flow of another preferred embodiment of FIG. 10.

FIG. 12 is a flow chart 700 illustrating the operational flow of the information removal system of the above-described embodiment of FIG. 10. Reference will be made to above-described components without corresponding numbering. Customer contacts network server to access the pin server 702. Through interactive communication over the network server, customer is granted a unique PIN access code 704. PIN server also generates a debit bill for service directly to customer's phone bill or by a financial transaction over the network server 704. Customer creates a text message, either locally on the message data generator or virtually on the network server, that includes the PIN access code granted by PIN server and personal identification data 706. Customer initiates communication with central controller and uploads text message to central controller 708. As described above, network server is in communication with central controller and network server automatically forwards the text message to central controller. Thus, customer preferably need not make a separate communication with central controller, rather network server provides a direct on-line connection to central controller via, e.g., a web page server. Upon receiving the text message, central controller compares text message to information supplied by PIN server to validate the PIN account based on personal identification data contained in the text message 710 (i.e., using PIN server access and updating 612 and 614, respectively). If the comparison is not valid 716, indicating either that customer has supplied the wrong PIN number or the personal identification associated with the PIN number does not match, central controller generates a message (e.g., email) to customer indicating current status. If a match is found, central controller stores message data in the local database 720. Upon receiving and storing the message, central controller initiates communication with an external (remote) database n 722 over the network server. Central controller queries database n, using control signals supplied by central controller over the network server, for information matching the personal identification data 724. Central controller, and more specifically, external database controller determines if a match is found between message data and data contained in the external database 726. If a match is not found, external database controller initiates communication to another preselected database n+1. If a match is found, central controller controls the external database (over the network server), based on control signals initiated by the external database controller, to remove information in that database matching the personal identification data 728. External database controller then initiates communication to another preselected database n+1, and the above process repeats. After all of the preselected external databases are contacted by central controller, central controller generates a report to customer indicating which databases had personal identification data removed 730.

In any of the above-described embodiments, central controller 18, 18' and 18" is adapted to contain optimal searching parameters of database systems 22 for information removal and/or dispersal. Optimal searching is based on the specific content of message data 12, 12', 12" and also the specific database system 22, 22' to be controlled by central controller. Thus, central controller 18, 18' and 18" is adapted to interpret message data 12, 12', 12" to recognize the specific data contained therein. Interpretation of message data 12, 12', 12" can be based on specific text search strings initiated by central controller so that central controller can make an optimal decision for information searching and/or removal. Also, central controller 18, 18' and 18" is adapted to optimally control database systems 22, 22' based on the message data and also based on the particular database system to be controlled. In addition, central controller is adapted to contain optimal searching parameters of a plurality of database systems 22, 22' and further to implement such parameters in an automatic fashion.

As mentioned above, the information dispersal system of the present invention is intended to facilitate refined searching and dispersal of information from a plurality of preselected, specialized database systems 22, 22'. While not wishing to be bound by example, the present invention can provide specialized, efficient information dispersal for medical professionals, legal professionals, trade professionals, localized civic events, voting preferences and voting histories of senators, congressmen at both national and local levels, specific commercial activities, and any other specialized transaction where a user requires specific information on a specific topic. Central controller is therefore adapted to contain control information for a plurality of preselected database systems related to the specialized information requested. To that end, central control is adapted to interpret the incoming message to optimally find the correct information desired. Thus, for example, central controller can provide a user interface that restricts the users' information input, thereby inherently refining the search parameters. This can be accomplished, for example, by providing a web-page interface that requires the user to "pigeon-hole" an information request by requiring progressive refinements. Alternatively, central controller can be adapted to read the message data in directly and scan the text for specific text strings or words that indicate the information request. Either way, central controller initiates communication and control of the database systems based on the message data content.

Moreover, central controller, via administration system, is continually updated with new database systems that can be controlled by central controller and that fit into a specific category of user information requests.

Thus, it is evident that there has been provided a message broadcast system and method for operating same that fully satisfy both the aims and objectives hereinbefore set forth. It will be appreciated that although specific embodiments and methods of use have been presented, many modifications, alternatives and equivalents are possible.

There are certain direct marketing database systems that cannot communicate with the central controller 18, 18' or 18". In addition, certain database systems require a written (i.e., hardcopy) removal request before removing personal identification data therefrom. In either instance, central controller 18, 18' and 18" can be appropriately modified to communicate with certain ones of the preselected database systems that are adapted to generate a hardcopy message and supply these certain database systems with the appropriate location information indicating where to forward the hardcopy message.

Local database 46, 46', 46" has been described above as containing information generated from user 28, 28', 28", and database system 22, but local database 46, 46', 46" can also be appropriately configured to contain control data related to PIN server 64, 64' and network server 66. Of course, local database 46, 46', 46" can be separate databases, each separately containing the above-described parameters, or local database 46, 46', 46" can be one unified database appropriately programmed to contain these parameters in the appropriate format. Optimal search parameters based on the particular message data received and the particular database to be controlled can also be stored on the local database 46, 46', 46" and preferably operate in conjunction with the external database controller 44, 44' to permit optimal control of the external database systems from the central controller.

Also, the foregoing detailed description described storing the message data on local database 46, 46', 46" before other action is taken (i.e., communication with database systems 22 and 22'); however, it is to be understood that storing, as defined herein, is only an operational parameter of maintaining the message data locally (i.e., local to the central controller). Thus, storing the message data need not be an additional process that requires additional hardware, but can merely be performed locally in ROM or RAM when the message data is uploaded by the message data generator.

External database controller 44, 44' is appropriately programmed to facilitate communication with and control of external database systems 22. To this end, administration system can be appropriately configured so as to have global control external database controller 44, 44'. Processor 38, 38' is configured to generally control local database and external database controller, and can be a standard off-the-shelf process (e.g., Pentium, RISC) or a customized processor (e.g., PLD), as is known by those skilled in the art. Of course, processor 38, 38' has associated ROM/RAM system 42, 42' for local information processing. Also, central controller and administration system 68 can be separate components or all part of one unified system.

Although the foregoing detailed description has proceeded without reference to specific hardware and/or software for implementing the system, it will be understood by those skilled in the art that central controller 18, 18' and 18" of the present invention can be implemented with various hardware, software, or any combination thereof, without departing from the scope of the present invention. Preferably central controller 18, 18' and 18" is implemented with a high-speed computer system and control software that has general applicability to many control scenarios for controlling the database systems heretofore described. Thus, for example, to facilitate high-speed transmission, central controller 18, 18' and 18" can be adapted to communicate over the network using a T1 and/or T3 communication system. Moreover, central controller 18, 18' and 18" can be adapted to permit real-time user interactivity, thus permitting a user to complete the entire transaction (e.g., information removal and/or information dispersal) at one time.

In addition, network server 66 can be a preprogrammed internet web page having a user interface that supplies an email messaging system and a direct link to central controller 18, 18', 18". Thus, instead of user creating a text message locally using message data generator, user can create the text message directly on the network server. To this end, network server can be appropriately configured to provide a "fill-in-the-blanks" text message interface for the user. PIN server 64' is programmed by administration system 68 to communicate with network server and further to provide administrative control over PIN server 64', via network server 66. Thus, central controller 18" has global control over parameters offered by PIN server 64.

Although the foregoing detailed description has been described with reference to a variety of particular utilities of the present invention, the present invention is of broad scope intended to cover centralized transactions where an information dispersal system has advantages over the art. For example, the present invention can be utilized as a centralized commercial transaction system whereby users (or customers) can engage in a variety of commercial transactions using the aforementioned information dispersal system of the present invention. Some examples include travel information, greeting card services, news and news related information, etc. In addition, the information dispersal system of the present invention can be adapted to permit a variety of other transactions. For example, the present invention can be utilized as a means of posting a single resume from a job applicant to all appropriate job banks in any geographically remote database systems, as requested by the applicant. Therefore, the present invention is intended to permit message broadcasting (information removal and/or information dispersal) from a centralized controller to access to a variety of geographically remote database systems, depending on the particular request from the user. Of course, to facilitate the above-mentioned transactions, central controller must be appropriately programmed to connect with the particular databases systems, as described herein. The present invention is intended to cover all such applications of the information dispersal system described herein, as set forth in the appending claims.

Accordingly, the present invention is intended to cover all such alternatives, modifications, and equivalents as may be included within the spirit and broad scope of the invention as defined only by the hereafter appended claims.

What is claimed is:

1. A system for providing information dispersal in a networked computing environment, comprising:
    a plurality of database servers distributed throughout a networked computing environment, each database server comprising a database storing information staged for retrieval upon user request;
    a user system uploading a message specifying an information request and a PIN with the information request identifying a set of the information staged on the database servers for retrieval;
    a PIN server communicatively interfaced to the user system, which directly establishes the PIN on the PIN server; and
    a central controller communicatively interfaced to the user system and each of the database servers and communicatively interfaced to the PIN server, the central controller periodically updating and administering validation information stored on the database of each database server comprising issuance of each PIN by the PIN server, validating the PIN for the user system against the validation information stored on the database of the particular database, and controlling the database servers to disperse the information requested in the uploaded message.

2. A system according to claim 1, wherein the information comprises content, the system further comprising:
    each such database server storing the content into the information in an encoded format.

3. A system according to claim 1, further comprising:
    the central controller interfacing to the plurality of database servers in a control and communications structure.

4. A system according to claim 1, further comprising:
    the central controller queuing multiple requests from one or more user systems.

5. A system according to claim 1, further comprising:
    the central controller automatically interpreting each message for the information contained therein, determining which database system is to be controlled, and automatically employing an optimal search or control routine based on the message and the particular database system.

6. A method for providing information dispersal in a networked computing environment, comprising:
    distributing a plurality of database servers throughout a networked computing environment, each database server comprising a database storing information staged for retrieval upon user request;
    communicatively interfacing a central controller to a user system and each of the database servers;
    communicatively interfacing a PIN server to the user system and the central controller;
    directly establishing a PIN on the PIN server via the user system;
    periodically updating and administering validation information stored on the database of each database server comprising issuance of each such PIN by the PIN server;
    uploading a message specifying an information request and one such PIN from the user system with the information request identifying a set of the information staged on the database servers for retrieval;
    validating the one such PIN for the user system against the validation information stored on the database of the particular database servers; and
    controlling the database servers via the central controller to disperse the information requested in the uploaded message.

7. A method according to claim 6, wherein the information comprises content, the method further comprising:
    storing the content into the information in an encoded format on each such database server.

8. A method according to claim 6, further comprising:
    interfacing the plurality of database servers to the central controller in a control and communications structure.

9. A method according to claim 6, further comprising:
    queuing multiple requests from one or more user systems on the central controller.

10. A method according to claim 9, further comprising:
    automatically interpreting each message for the information contained therein;
    determining which database system is to be controlled; and
    automatically employing an optimal search or control routine based on the message and the particular database system.

11. A computer-readable storage medium holding code for performing the method of claim 6.

* * * * *